(12) United States Patent
Men (10) Patent No.: US 10,035,199 B2
(45) Date of Patent: Jul. 31, 2018

(54) CUTTING TOOL AND TRIANGULAR-SHAPED INDEXABLE CUTTING INSERT THEREFOR

(71) Applicant: Iscar, Ltd., Tefen (IL)

(72) Inventor: Yuri Men, Haifa (IL)

(73) Assignee: Iscar, Ltd., Tefen (IL)

( * ) Notice: Subject to any disclaimer, the term of this patent is extended or adjusted under 35 U.S.C. 154(b) by 215 days.

(21) Appl. No.: 15/197,855

(22) Filed: Jun. 30, 2016

(65) Prior Publication Data
US 2018/0001400 A1     Jan. 4, 2018

(51) Int. Cl.
*B23C 5/20* (2006.01)
*B23C 5/22* (2006.01)
*B23C 5/06* (2006.01)

(52) U.S. Cl.
CPC .............. *B23C 5/2247* (2013.01); *B23C 5/06* (2013.01); *B23C 2200/0483* (2013.01)

(58) Field of Classification Search
CPC ................ B23C 5/2247; B23C 5/2221; B23C 2200/0477; B23C 2200/0483; B23C 2200/0416; B23C 2200/128; B23C 2200/365; B23C 2200/367; B23C 2200/286; B23C 2210/168; B23B 2200/369
See application file for complete search history.

(56) References Cited

U.S. PATENT DOCUMENTS

| | | | |
|---|---|---|---|
| 4,318,644 A | 3/1982 | Seidel | |
| 4,755,085 A | 7/1988 | Murén et al. | |
| 5,695,303 A | 12/1997 | Boianjiu et al. | |
| 7,494,303 B2 | 2/2009 | Koskinen | |
| 8,430,606 B2 | 4/2013 | Zettler | |
| 9,421,622 B2* | 8/2016 | Segev | ................... B23B 51/048 |
| 9,457,413 B2* | 10/2016 | Matsumoto | ............... B23C 5/08 |

(Continued)

FOREIGN PATENT DOCUMENTS

CN       103506680 A       1/2014

OTHER PUBLICATIONS

International Search Report dated Oct. 23, 2017, issued in PCT counterpart application (No. PCT/IL2017/050629).

(Continued)

*Primary Examiner* — Will Fridie, Jr.
(74) *Attorney, Agent, or Firm* — Womble Bond Dickinson (US) LLP (57) ABSTRACT

An indexable cutting insert has opposing upper and lower end surfaces, and a peripheral surface including three side surfaces and three corner surfaces. Each corner surface intersects the upper end surface to form an upper cutting edge, and each side surface has a locating surface. The lower end surface has three radially outward facing lower abutment surfaces. The three locating surfaces define a first imaginary triangle having three first bisector planes and three locating planes, and the three lower abutment surfaces define a second imaginary triangle having three second bisector planes. None of the first and second bisector planes are coplanar, and each locating plane intersects two of the upper cutting edges. For each index position of the cutting insert in an insert receiving pocket of a cutting tool, one of the locating surfaces and one of the lower abutment surfaces is in contact with pocket walls thereof.

23 Claims, 9 Drawing Sheets

(56) References Cited

U.S. PATENT DOCUMENTS

| | | | |
|---|---|---|---|
| 2010/0329800 A1 | 12/2010 | Edler et al. | |
| 2012/0201622 A1* | 8/2012 | Kocherovsky | B23B 29/02 |
| | | | 409/131 |
| 2012/0282054 A1* | 11/2012 | Jager | B23B 27/145 |
| | | | 408/200 |
| 2013/0251464 A1* | 9/2013 | Hecht | B23C 5/06 |
| | | | 407/48 |
| 2013/0336734 A1 | 12/2013 | Morgulis et al. | |
| 2014/0010605 A1* | 1/2014 | Smilovici | B23C 5/06 |
| | | | 407/42 |
| 2014/0227048 A1* | 8/2014 | Heinloth | B23C 5/12 |
| | | | 407/51 |
| 2014/0377020 A1* | 12/2014 | Kurokawa | B23C 5/08 |
| | | | 407/51 |
| 2015/0202697 A1* | 7/2015 | Shiota | B23C 5/109 |
| | | | 407/42 |
| 2016/0107248 A1 | 4/2016 | Smycek | |

OTHER PUBLICATIONS

Written Opinion dated Oct. 23, 2017, issued in PCT counterpart application (No. PCT/IL2017/050629).

\* cited by examiner

CUTTING TOOL AND TRIANGULAR-SHAPED INDEXABLE CUTTING INSERT THEREFOR

FIELD OF THE INVENTION

The present invention relates to a cutting tool and a triangular shaped indexable cutting insert therefor, for use in metal cutting processes in general, and for milling and profiling operations in particular.

BACKGROUND OF THE INVENTION

Within the field of cutting tools used in milling and profiling operations, there are many examples of triangular-shaped indexable cutting inserts removably retained in an insert receiving pocket of a cutting body.

CN 103506680 discloses a triangular shaped indexable cutting insert having opposing upper and lower end surfaces with a peripheral surface extending therebetween, the peripheral surface including three side surfaces and three corner surfaces, each corner surface intersecting an upper end surface to form a curved upper cutting edge, and each side surface having an inwardly recessed locating surface.

US 2016/0107248 discloses a triangular shaped indexable cutting insert having opposing upper and lower end surfaces with a peripheral surface extending therebetween, the peripheral surface including three side surfaces and three corner surfaces, each corner surface intersecting an upper end surface to form an upper cutting edge. Each upper cutting edge includes a radiused component having a first end and a second end and first and second components at the first and the second ends of the radiused component, respectively, the first and second components being less curved than the radiused component. The lower end surface includes three radially extending mounting grooves, and each side surface includes at least one substantially V-shaped valley formed by first and second support surfaces.

It is an object of the present invention to provide an improved triangular-shaped indexable cutting insert having a compact mounting means.

It is also an object of the present invention to provide an improved cutting tool in which the triangular shaped indexable cutting insert is removably secured in a cutting body with a high level of stability.

It is a further object of the present invention to provide an improved cutting tool particularly suitable for milling and profiling operations.

SUMMARY OF THE INVENTION

In accordance with the present invention, there is provided an indexable triangular-shaped cutting insert having opposing upper and lower end surfaces with a peripheral surface extending therebetween and a central axis extending therethrough, the peripheral surface including three side surfaces circumferentially alternating with three corner surfaces, each corner surface intersecting the upper end surface to form an upper cutting edge, and each side surface having an inwardly recessed locating surface, the lower end surface having a raised lower support surface and three lower abutment recesses circumferentially spaced around the lower support surface, each lower abutment recess including a radially outward facing lower abutment surface, wherein:

in a first cross-section taken in a median plane perpendicular to the central axis and intersecting the three locating surfaces, the three locating surfaces define a first imaginary triangle having:
three first sides and three first corners,
three first bisector planes, each first bisector plane containing the central axis and bisecting one of the three first corners, and
three vertical locating planes, each vertical locating plane being perpendicular to the median plane and containing one of the three first sides, in a second cross-section taken in a horizontal lower plane parallel to the median plane and intersecting the three lower abutment surfaces, the three lower abutment surfaces define a second imaginary triangle having:
three second sides and three second corners, and
three second bisector planes, each second bisector plane containing the central axis and bisecting one of the three second corners,
none of the three second bisector planes is coplanar with any of the three first bisector planes, and
each vertical locating plane intersects two of the upper cutting edges.

Also in accordance with the present invention, there is provided a cutting tool comprising a cutting body comprising an insert receiving pocket having a base surface and spaced apart first and second pocket walls transverse to the base surface, the first and second pocket walls forming an external pocket angle in a front view of the insert receiving pocket, and an indexable triangular-shaped cutting insert removably secured in the insert receiving pocket of the cutting body,
the cutting insert comprising:
opposing upper and lower end surfaces with a peripheral surface extending therebetween and a central axis extending therethrough, the peripheral surface including three side surfaces circumferentially alternating with three corner surfaces, each corner surface intersecting the upper end surface to form an upper cutting edge, and each side surface having a locating surface, the lower end surface having a raised lower support surface and three lower abutment recesses circumferentially spaced around the lower support surface, each lower abutment recess including a radially outward facing lower abutment surface, and in a first cross-section taken in a median plane perpendicular to the central axis and intersecting the three locating surfaces, the three locating surfaces define a first imaginary triangle having:
three first sides and three first corners,
three first bisector planes, each first bisector plane containing the central axis and bisecting one of the three first corners, and
three vertical locating planes, each vertical locating plane being perpendicular to the median plane and containing one of the three first sides,
wherein:
the lower support surface makes contact with the base surface;
only one of the three locating surfaces is operative, making contact with the first pocket wall, and
only one of the three lower abutment surfaces is operative, making contact with the second pocket wall.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to an indexable cutting insert 20, as shown in FIGS. 1 to 4, having opposing upper and lower end surfaces 22, 24 with a peripheral surface 26 extending therebetween and a central axis A1 extending therethrough.

In some embodiments of the present invention, the cutting insert 20 may be indexable about the central axis A1.

Also in some embodiments of the present invention, the cutting insert 20 may preferably be manufactured by form pressing and sintering a cemented carbide, such as tungsten carbide, and may be coated or uncoated.

According to the present invention, as shown in FIGS. 1 to 4, the peripheral surface 26 includes three side surfaces 28 circumferentially alternating with three corner surfaces 30, with each corner surface 30 intersecting the upper end surface 22 to form an upper cutting edge 32, and each side surface 28 having a locating surface 34.

In some embodiments of the present invention, each corner surface 30 may extend parallel to the central axis A1 and intersect both the upper and lower end surfaces 22, 24.

Also in some embodiments of the present invention, each locating surface 34 may be planar.

Further in some embodiments of the present invention, each locating surface 34 may intersect both the upper and lower end surfaces 22, 24.

Figure 5:
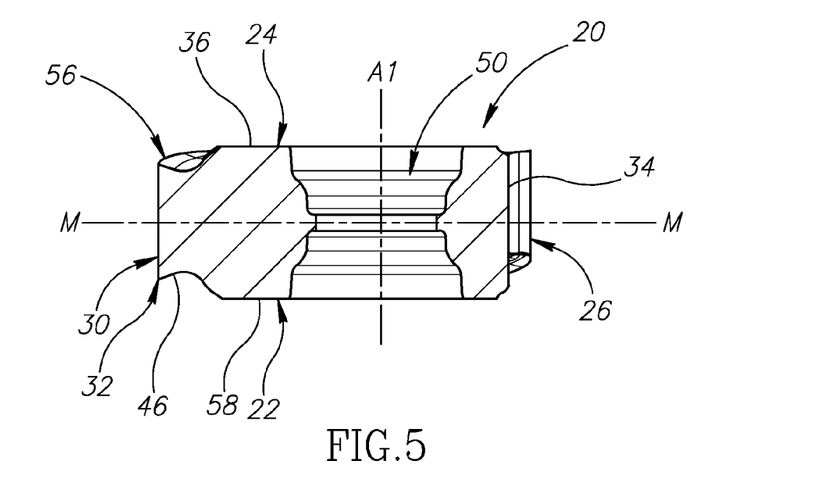
FIG. 5 is a cross-sectional view of the cutting insert shown in FIG. 2, taken along the line V-V.

As shown in FIG. 5, each locating surface 34 may be parallel to the central axis A1.

In some embodiments of the present invention, the entire peripheral surface 26 may extend parallel to the central axis A1 and intersect both the upper and lower end surfaces 22, 24, and the cutting insert 20 may be described as a 'negative' type cutting insert.

According to the present invention, as shown in FIGS. 1 to 4, the lower end surface 24 has a raised lower support surface 36 and three lower abutment recesses 38 circumferentially spaced around the lower support surface 36, each lower abutment recess 38 including a radially outward facing lower abutment surface 40.

In some embodiments of the present invention, the lower support surface 36 may be planar, defining a lower support plane $P_{LS}$ perpendicular to the central axis A1.

Figure 3:
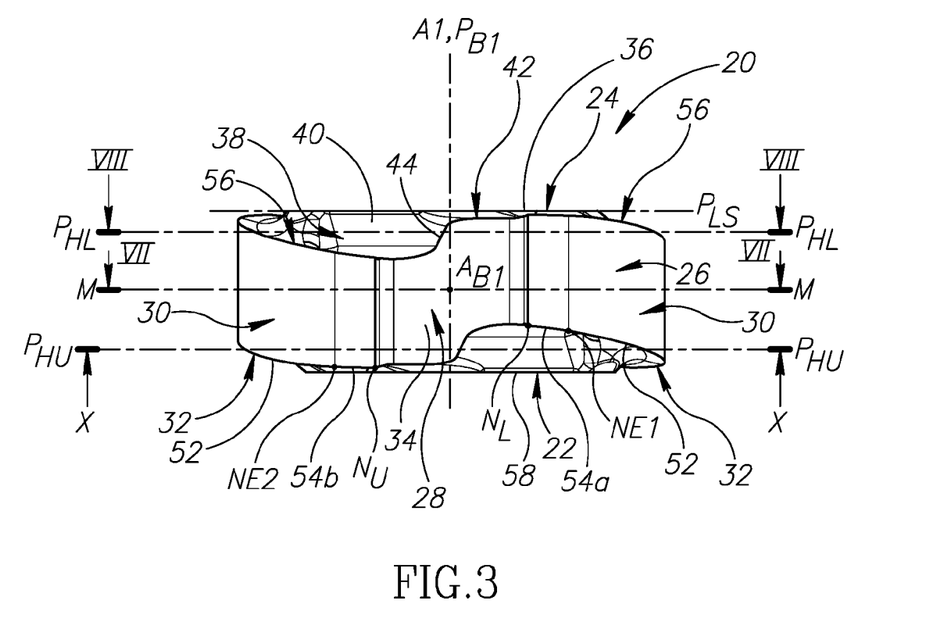
FIG. 3 is a side view of the cutting insert shown in FIG. 1.
Figure 4:
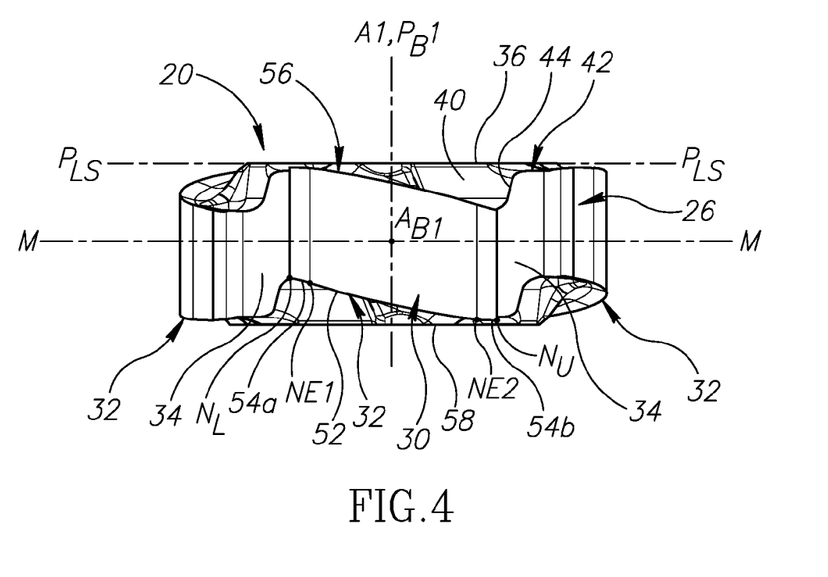
FIG. 4 is a corner side view of the cutting insert shown in FIG. 1.

As shown in FIGS. 3 and 4, the lower support plane $P_{LS}$ may not intersect any of the three corner surfaces 30.

Also as shown in FIGS. 3 and 4, the lower support plane $P_{LS}$ may not intersect the peripheral surface 26, thus enabling the raised lower support surface 36 to be efficiently ground.

In some embodiments of the present invention, each lower abutment surface 40 may be planar.

Figure 6:
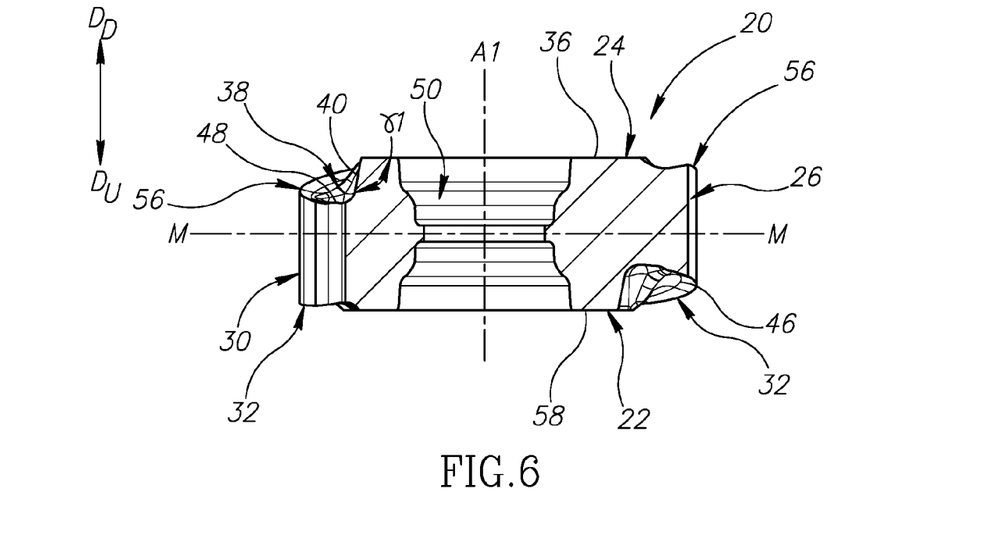
FIG. 6 is a cross-sectional view of the cutting insert shown in FIG. 2, taken along the line VI-VI.

As shown in FIG. 6, each lower abutment surface 40 may be non-parallel to the central axis A1.

Also as shown in FIG. 6, each lower abutment surface 40 may form an internal obtuse inclination angle γ1 with the lower support surface 36, and each obtuse inclination angle γ1 may have a value less than or equal to 120°.

It should be appreciated that use of the term "internal angle" throughout the description and claims refers to an angle between two planar surface components as measured internal to the member on which these surface components are formed.

As shown in FIG. 3, in a side view of the cutting insert 20 perpendicular to one of the three locating surfaces 34, only one lower abutment surface 40 may be visible.

Also as shown in FIG. 3, the said one lower abutment surface 40 may be entirely visible.

In some embodiments of the present invention, the three lower abutment recesses 38 may be identical.

Figure 1:
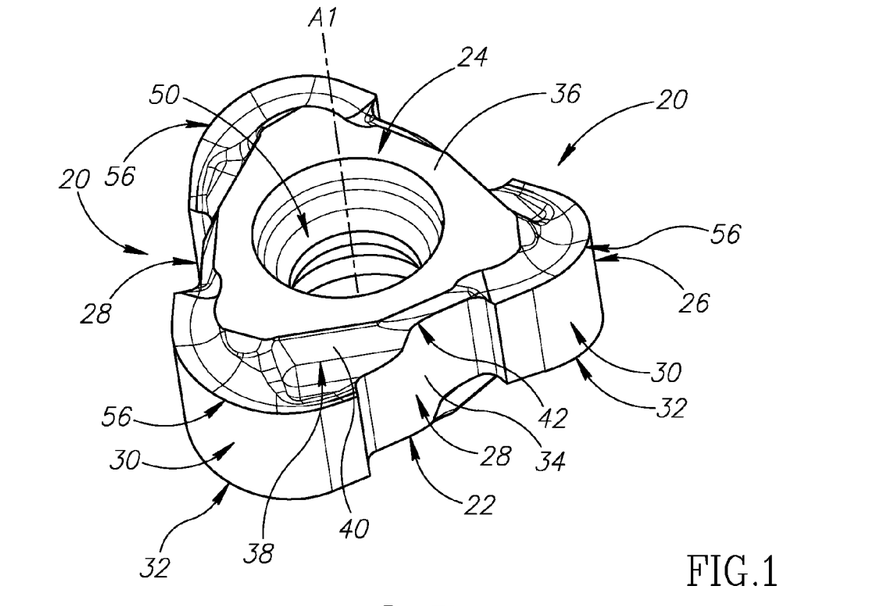
FIG. 1 is a perspective view of a cutting insert in accordance with some embodiments of the present invention.
Figure 2:
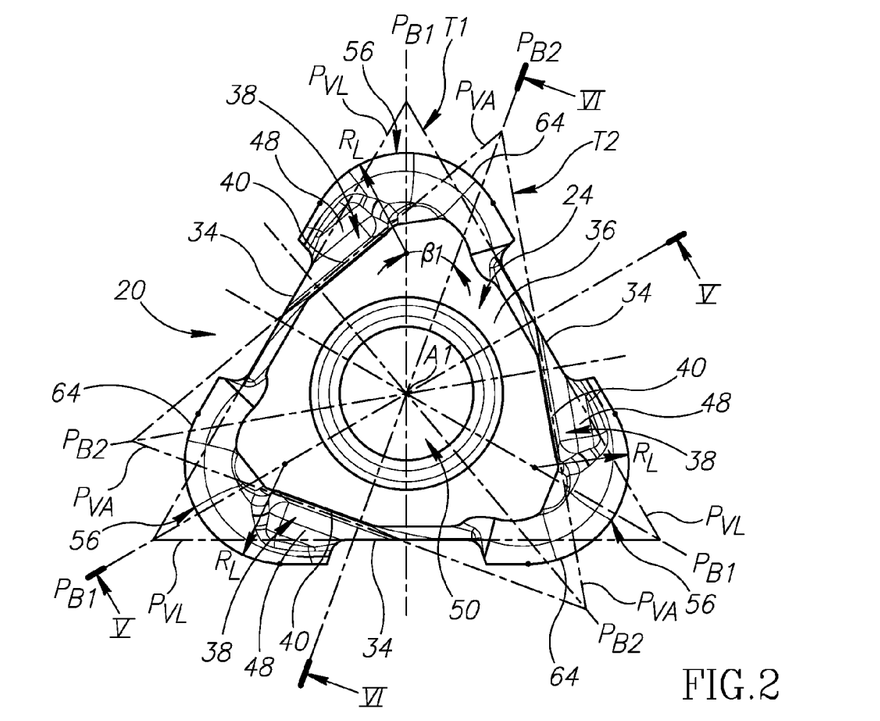
FIG. 2 is a first end view of the cutting insert shown in FIG. 1.

As shown in FIG. 2, the lower end surface 24 may exhibit three-fold rotational symmetry about the central axis A1.

In some embodiments of the present invention, a lower peripheral edge 42 may be formed at the intersection of the lower end surface 24 and the peripheral surface 26.

As shown in FIG. 3, each lower abutment surface 40 may intersect the peripheral surface 26 at a single peripheral edge portion 44 of the lower peripheral edge 42.

Also as shown in FIG. 3, each lower abutment surface 40 may intersect one of the three locating surfaces 34 at one of the three peripheral edge portions 44.

Figure 7:
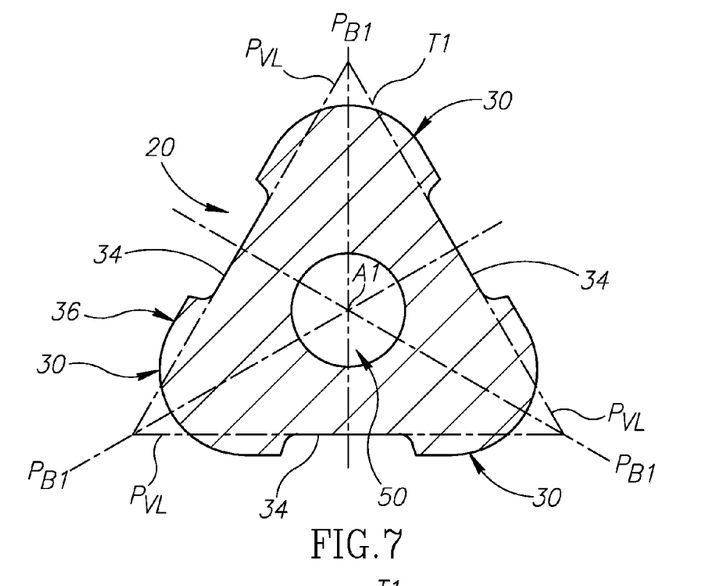
FIG. 7 is a cross-sectional view of the cutting insert shown in FIG. 3, taken along the line VII-VII.

According to the present invention, in a first cross-section taken in a median plane M perpendicular to the central axis A1 and intersecting the three locating surfaces 34, as shown in FIG. 7, the three locating surfaces 34 define a first imaginary triangle T1 having three first sides and three first corners. The first imaginary triangle T1 has three first bisector planes $P_B1$ and three vertical locating planes PIT, each first bisector plane $P_B1$ containing the central axis A1 and bisecting one of the first imaginary triangle's three first corners, and each vertical locating plane $P_{VL}$ being perpendicular to the median plane M and containing one of the first imaginary triangle's three first sides.

In some embodiments of the present invention, each first bisector plane $P_B1$ may intersect one of the upper cutting edges 32.

Also in some embodiments of the present invention, as shown in FIG. 7, each first bisector plane $P_B1$ may intersect one of the locating surfaces 34.

Further in some embodiments of the present invention, the upper end surface 22 may include an upper rake surface 46 adjacent each upper cutting edge 32.

As shown in FIGS. 5 and 6, each upper rake surface 46 may be inwardly inclined towards the median plane M, thus enabling the cutting insert 20 to perform cutting operations with a positive rake angle.

In some embodiments of the present invention, each lower abutment recess 38 may include a recess floor surface 48 adjacent to its respective lower abutment surface 40.

As shown in FIG. 6, the central axis A1 may extend in an upward-to-downward direction $D_U$, $D_D$, and each recess floor surface 48 may face away from the median plane M in a generally downward direction $D_D$.

In some embodiments of the present invention, the lower end surface 24 may not exhibit mirror symmetry about any of the three first bisector planes $P_B1$.

Also in some embodiments of the present invention, each lower abutment surface 40 may not intersect any of the three first bisector planes $P_B1$.

Further in some embodiments, as shown in FIG. 2, in an end view of the cutting insert 20, each lower abutment surface 40 may not extend outside the first imaginary triangle T1, thus providing a compact means for mounting the cutting insert 20.

Figure 8:
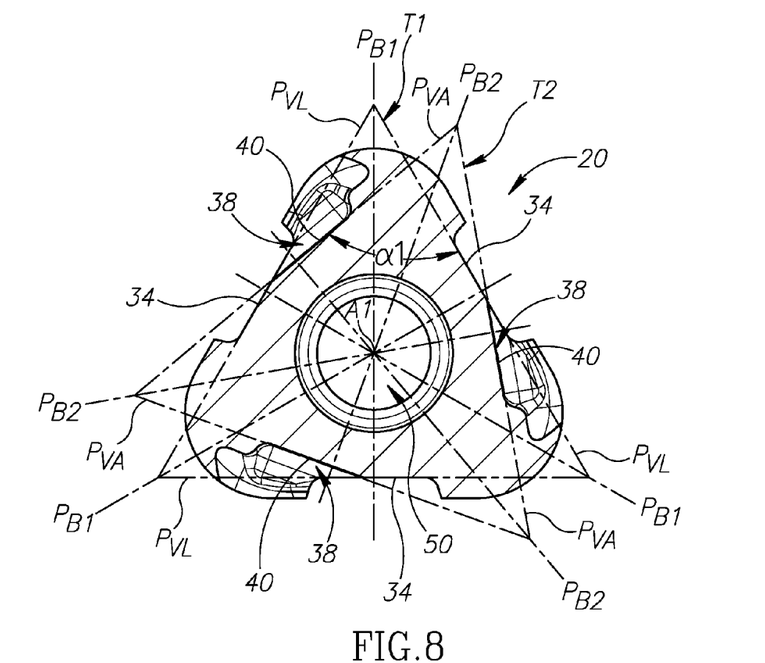
FIG. 8 is a cross-sectional view of the cutting insert shown in FIG. 3, taken along the line VIII-VIII.

In a first aspect of the present invention, in a second cross-section taken in a horizontal lower plane $P_{HL}$ parallel to the median plane M and intersecting the three lower abutment surfaces 40, as shown in FIG. 8, the three lower abutment surfaces 40 define a second imaginary triangle T2 having three second sides and three second corners. The second imaginary triangle T2 has three second bisector planes $P_B2$, each second bisector plane $P_B2$ containing the central axis A1 and bisecting one of the second imaginary triangle's three second corners.

In the first aspect of the present invention, none of the three second bisector planes $P_B2$ is coplanar with any of the three first bisector planes $P_B1$, thus providing a wider range of mounting options when utilizing the three locating surfaces 34 and the three lower abutment surfaces 40.

In some embodiments of the present invention, the first and second imaginary triangles T1, T2 may both be equilateral triangles.

As shown in FIG. 2, in an end view of the cutting insert 20, the second imaginary triangle's three second corners may be located outside the first imaginary triangle T1.

Also as shown in FIG. 2, in an end view of the cutting insert 20, the second imaginary triangle's three second corners may be located outside the perimeter of the cutting insert 20.

In some embodiments of the present invention, as shown in FIG. 2, the first and second bisector planes $P_B1$, $P_B2$ associated with rotationally adjacent corners of the first and second imaginary triangles T1, T2, respectively, may form an acute bisector angle $\beta1$, and the bisector angle $\beta1$ may have a value less than or equal to 30°.

Also in some embodiments of the present invention, as shown in FIG. 2, each second bisector plane $P_B2$ may intersect one of the lower abutment surfaces 40.

As shown in FIG. 3, the horizontal lower plane $P_{HL}$ may intersect the three locating surfaces 34.

As shown in FIG. 8, in the second cross-section taken in the horizontal lower plane $P_{HL}$, each lower abutment surface 40 may form an internal abutment angle $\alpha1$ with one of the locating surfaces 34.

In some embodiments of the present invention, each abutment angle $\alpha1$ may have a value greater than 60° and less than or equal to 90°, thus enabling the cutting insert 20 to be mounted with a high level of stability.

Also in some embodiments of the present invention, the abutment angle $\alpha1$ may have a value greater than 75°.

Further in some embodiments of the present invention, the cutting insert 20 may have a central bore 50 coaxial with the central axis A1 opening out to the lower support surface 36.

As shown in FIG. 2, in an end view of the cutting insert 20, the central bore 50 may be entirely located inside the second imaginary triangle T2.

In some embodiments of the present invention, as shown in FIG. 8, the second imaginary triangle T2 may have three vertical abutment planes $P_{VA}$, each vertical abutment plane $P_{VA}$ perpendicular to the median plane M and containing one of the second imaginary triangle's three second sides.

Figure 9:
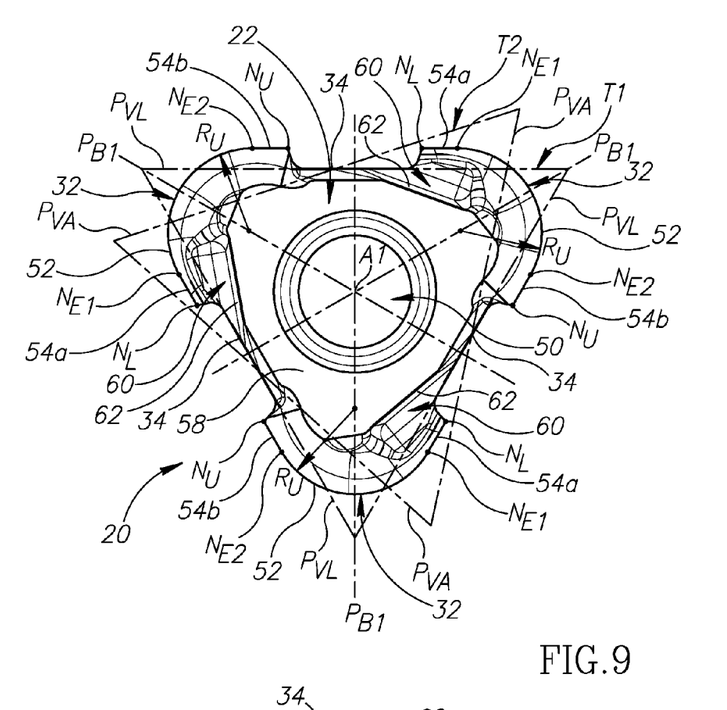
FIG. 9 is a second end view of the cutting insert shown in FIG. 1.

As shown in FIG. 9, each vertical abutment plane $P_{VA}$ may intersect one of the upper cutting edges 32.

In some embodiments of the present invention, as shown in FIGS. 3 and 4, each upper cutting edge 32 may include axial uppermost and axial lowermost points $N_U$, $N_L$ located furthest from and closest to the median plane M, respectively.

As shown in FIG. 9, in an end view of the cutting insert 20, the axial uppermost point $N_U$ may be located outside the second imaginary triangle T2.

Also as shown in FIG. 9, in an end view of the cutting insert 20, the axial lowermost point $N_L$ may be located inside the second imaginary triangle T2.

In the first aspect of the present invention, as shown in FIG. 9, each locating surface 34 may be inwardly recessed (i.e., recessed in an inward direction toward the central axis A1, in an end view of the cutting insert 20), and each vertical locating plane $P_{VL}$ may intersect two of the upper cutting edges 32.

It should be appreciated that by configuring the locating surfaces 34 to be inwardly recessed provides a compact means for mounting the cutting insert 20.

As shown in FIG. 9, in an end view of the cutting insert 20, each upper cutting edge 32 may include a curved upper nose edge portion 52 having first and second end points $N_E1$, $N_E2$.

In some embodiments of the present invention, each vertical locating plane $P_{VL}$ may intersect two of the upper nose edge portions 52 between their respective first and second end points $N_E1$, $N_E2$.

It should be appreciated that by configuring each curved upper nose edge portion 52 to extend across its two adjacent vertical locating planes $P_{VL}$ makes the cutting insert 20 particularly suitable for profiling operations.

As shown in FIG. 9, in an end view of the cutting insert 20, each upper nose edge portion 52 may have a constant upper nose edge radius $R_U$.

In some embodiments of the present invention, the upper nose edge radius $R_U$ may have a value between 0.25 mm and 5.0 mm.

As shown in FIG. 9, in an end view of the cutting insert 20, each upper cutting edge 32 may include two straight cutting edge portions 54a, 54b extending away from its respective upper nose edge portion 52.

In some embodiments of the present invention, each first bisector plane $P_B1$ may intersect one of the upper nose edge portions 52.

As shown in FIG. 9, in an end view of the cutting insert 20, each upper nose edge portion 52 may exhibit mirror symmetry about its respective first bisector plane $P_B1$.

As shown in FIG. 4, in a corner side view of the cutting insert 20, each upper nose edge portion 52 may slope towards the median plane M along its whole length.

In some embodiments of the present invention, as shown in FIGS. 2 and 9, the upper and lower end surfaces 22, 24 may be identical, with each corner surface 30 intersecting the lower end surface 24 to form a lower cutting edge 56, the upper end surface 22 having a raised upper support surface 58 and three upper abutment recesses 60 circumferentially spaced around the upper support surface 58, and each upper abutment recess 60 including a radially outward facing upper abutment surface 62.

In such embodiments of the present invention, the cutting insert 20 may be described as a 'double-sided' indexable cutting insert.

In some embodiments, each upper abutment recess 60 may border one of the upper rake surfaces 46.

Also in some embodiments, as shown in FIG. 9, in an end view of the cutting insert 20, each upper abutment surface 62 may not extend outside the first imaginary triangle T1, thus providing a compact means for mounting the double-sided cutting insert 20.

As shown in FIG. 2, in an end view of the cutting insert 20, each lower cutting edge 56 may include a curved lower nose edge portion 64.

Also as shown in FIG. 2, in an end view of the cutting insert 20, each lower nose edge portion 64 may have a constant lower nose edge radius $R_L$.

In some embodiments of the present invention, the lower nose edge radius $R_L$ may have a value between 0.25 mm and 5.0 mm.

As shown in FIGS. 3 and 4, each upper cutting edge 32 may be entirely located closer to the median plane M than the upper support surface 58, and each lower cutting edge 56 may be entirely located closer to the median plane M than the lower support surface 36.

In some embodiments of the present invention, both the lower and upper support surfaces 36, 58 may be planar and perpendicular to the central axis A1.

Also in some embodiments of the present invention, the central bore 50 may open out to both the lower and upper support surfaces 36, 58.

Figure 10:
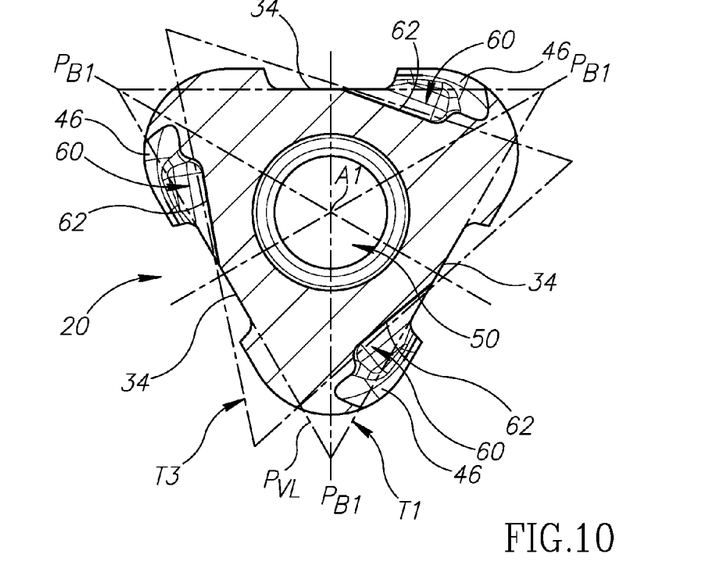
FIG. 10 is a cross-sectional view of the cutting insert shown in FIG. 3, taken along the line X-X.

As shown in FIG. 10, in a third cross-section taken in a horizontal upper plane $P_{HU}$ parallel to the median plane M and intersecting the three upper abutment surfaces 62, the three upper abutment surfaces 62 may define a third imaginary triangle T3.

Also as shown in FIG. 10, the three corners of the third imaginary triangle T3 may not coincide with the three first bisector planes $P_B1$ of the first imaginary triangle T1.

In some embodiments of the present invention, the median plane M may be located midway between the upper and lower end surfaces 22, 24, and the peripheral surface 26 may not exhibit mirror symmetry about the median plane M.

Also in some embodiments of the present invention, as shown in FIGS. 3 and 4, each first bisector plane $P_B1$ may intersect the median plane M to form a first bisector axis $A_B1$, and the cutting insert 20 may exhibit two-fold rotational symmetry about any one of the three first bisector axes $A_B1$.

As shown in FIGS. 11 to 17, a second aspect of the present invention relates to a cutting tool 66 having a cutting body 68 and at least one indexable cutting insert 20, each cutting insert 20 being removably secured in an insert receiving pocket 70 of the cutting body 68.

Figure 12:
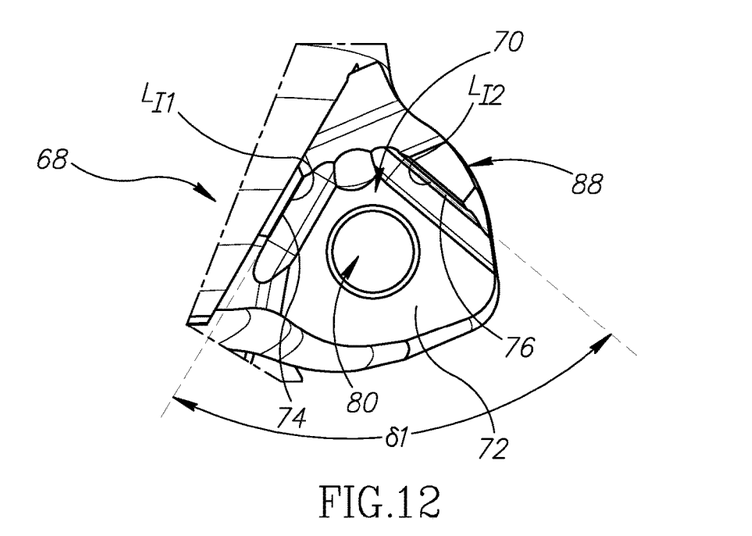
FIG. 12 is a front view of an insert receiving pocket of the cutting tool shown in FIG. 11, with its cutting insert removed.
Figure 13:
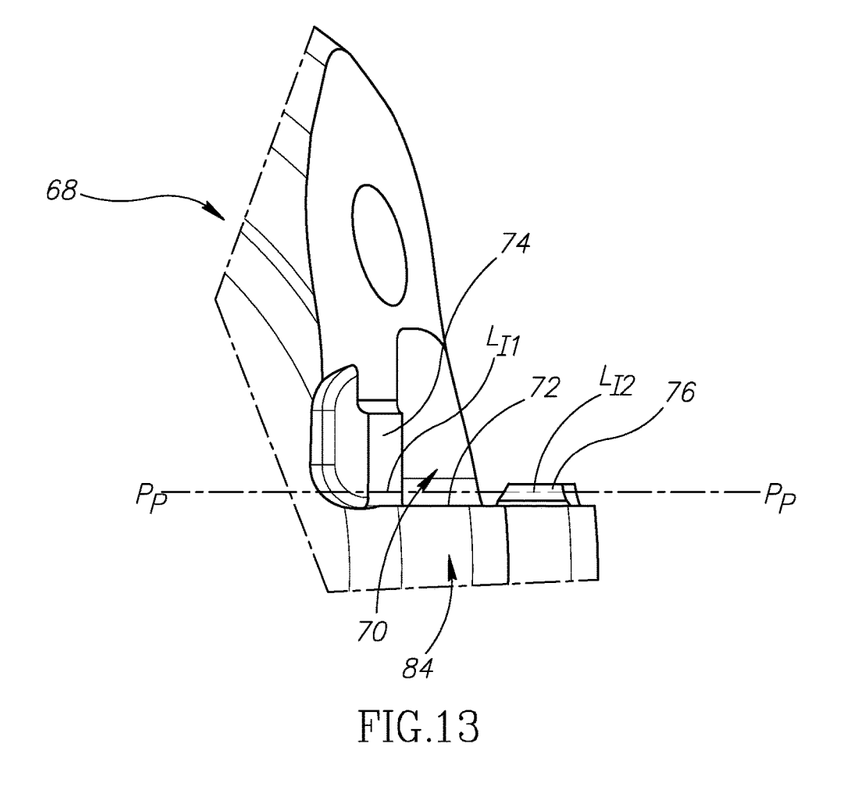
FIG. 13 is an end view of the insert receiving pocket shown in FIG. 12.

In the second aspect of the present invention, as shown in FIGS. 12 and 13, each insert receiving pocket 70 has a base surface 72 and spaced apart first and second pocket walls 74, 76 transverse to the base surface 72.

In some embodiments of the present invention, each cutting insert 20 may be removably secured in its respective insert receiving pocket 70 by means of a clamping screw 78 extending through the central bore 50 and engaging a threaded bore 80 in the base surface 72.

In the second aspect of the present invention, in a front view of the insert receiving pocket 70, as shown in FIG. 12, the first and second pocket walls 74, 76 form an external pocket angle $\delta1$.

In some embodiments of the present invention, the base surface 72 may be planar.

Also in some embodiments of the present invention, as shown in FIG. 13, a pocket plane $P_P$ parallel to the base surface 72 may intersect the first and second pocket walls 74, 76 to form first and second imaginary straight intersection lines LI1, LI2, respectively.

Also as shown in FIG. 12, the pocket angle $\delta1$ may be formed between the first and second imaginary intersection lines LI1, LI2.

In some embodiments of the present invention, the pocket angle $\delta1$ may have a value greater than 60° and less than or equal to 90°, thus enabling the cutting insert 20 to be mounted in the insert receiving pocket 70 with a high level of stability.

Also in some embodiments of the present invention, the pocket angle $\delta1$ may have a value greater than 75°.

Further in some embodiments of the present invention, the pocket angle $\delta1$ may be equal to the abutment angle $\alpha1$.

Figure 16:
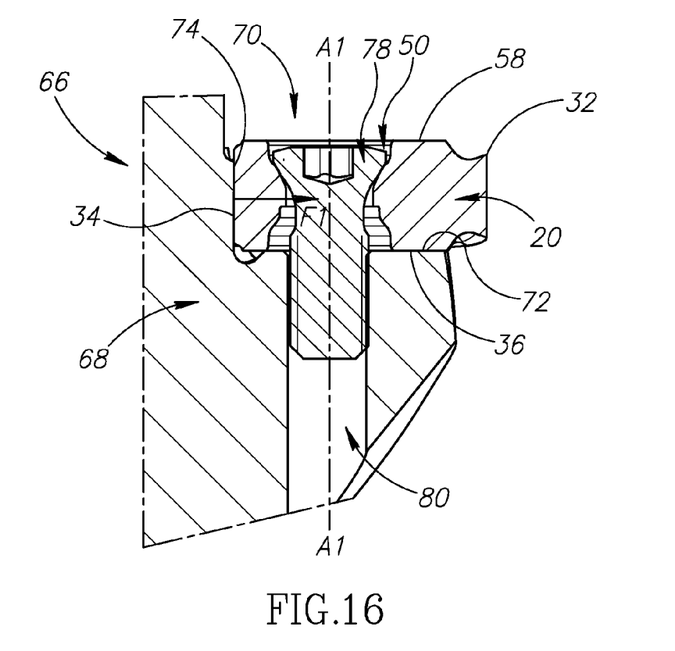
FIG. 16 is a cross-sectional view of the insert receiving pocket shown in FIG. 14, taken along the line XVI-XVI.

As shown in FIG. 16, the first pocket wall 74 may be planar and perpendicular to the base surface 72.

Figure 17:
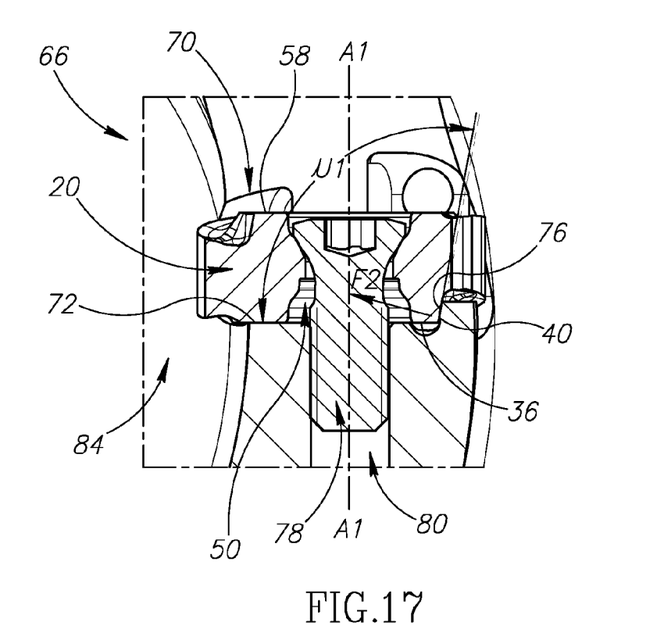
FIG. 17 is a cross-sectional view of the insert receiving pocket shown in FIG. 14, taken along the line XVII-XVII.

As shown in FIG. 17, the second pocket wall 76 may be planar and form an external obtuse first support angle $\mu1$ with the base surface 72.

Figure 14:
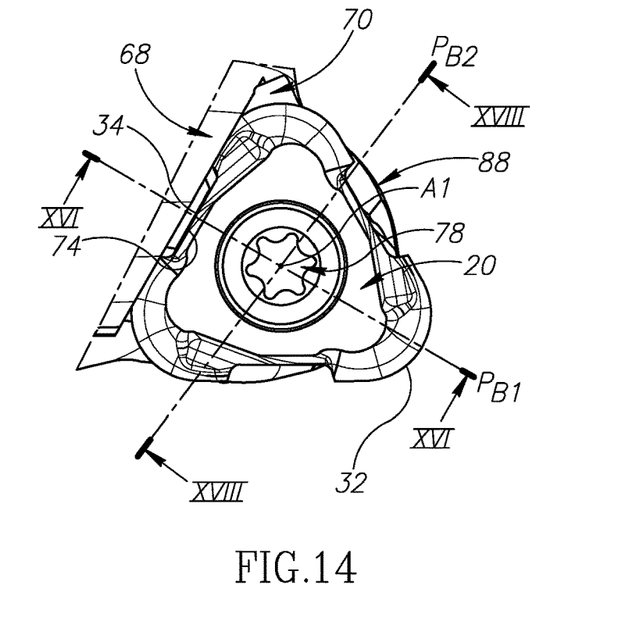
FIG. 14 is the front view of the insert receiving pocket shown in FIG. 12, with its cutting insert secured.
Figure 15:
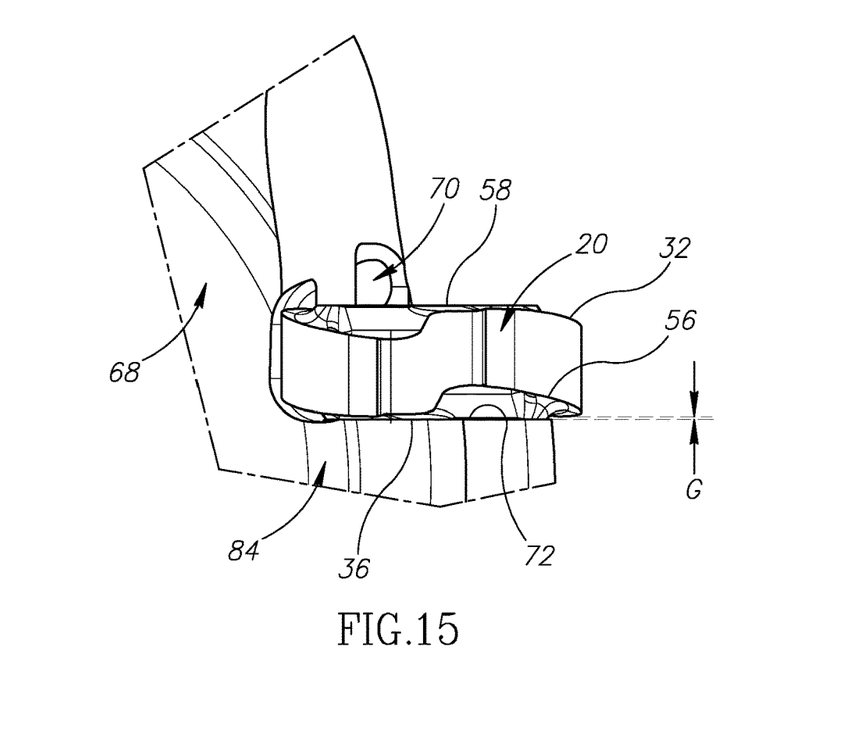
FIG. 15 is an end view of the insert receiving pocket shown in FIG. 14.

In the second aspect of the present invention, for each index position in which the lower support surface 36 makes contact with the base surface 72, and one of the upper cutting edges 32 is operative:

only one of the three locating surfaces 34 is operative, making contact with the first pocket wall 74, and only one of the three lower abutment surfaces 40 is operative, making contact with the second pocket wall 76.

Apart from these said instances of contact, each cutting insert 20 may make no additional contact with its respective insert receiving pocket 70.

As shown in FIG. 14, the first bisector plane $P_B1$ intersecting the operative upper cutting edge 32 also intersects the operative locating surface 34 and the first pocket wall 74.

It should be appreciated that for embodiments of the present invention in which each first bisector plane $P_B1$ intersects one of the locating surfaces 34, a first reaction force F1 opposing the cutting forces acting at the operative first pocket wall 74 is advantageously directed through the central axis A1 and the clamping screw 78, as shown in FIG. 16.

It should also be appreciated that for embodiments of the present invention in which each second bisector plane $P_B2$ intersects one of the lower abutment surfaces 40, a second reaction force F2 opposing the cutting forces acting at the operative second pocket wall 76 is advantageously directed through the central axis A1 and the clamping screw 78, as shown in FIG. 17.

It should be further appreciated that for embodiments of the present invention in which each lower cutting edge 56 is entirely located closer to the median plane M than the lower support surface 36, and the lower support surface 36 is in contact with the base surface 72, a gap G is advantageously provided between the non-operative lower cutting edges 56 and the base surface 72, as shown in FIG. 15.

It should be still further appreciated that for embodiments of the present invention in which each lower abutment surface 40 does not extend outside the first imaginary triangle T1 in an end view of the cutting insert 20, the second pocket wall 76 also does not extend outside the first imaginary triangle T1, and thus a compact mounting arrangement is achieved.

In some embodiments of the present invention (not shown), for each index position in which the upper support surface 58 makes contact with the base surface 72, and one of the lower cutting edges 56 is operative:

only one of the three locating surfaces 34 may be operative, and make contact with the first pocket wall 74, and only one of the three upper abutment surfaces 60 may be operative, and make contact with the second pocket wall 76.

Apart from these said instances of contact, each cutting insert 20 may make no additional contact with its respective insert receiving pocket 70.

Figure 11:
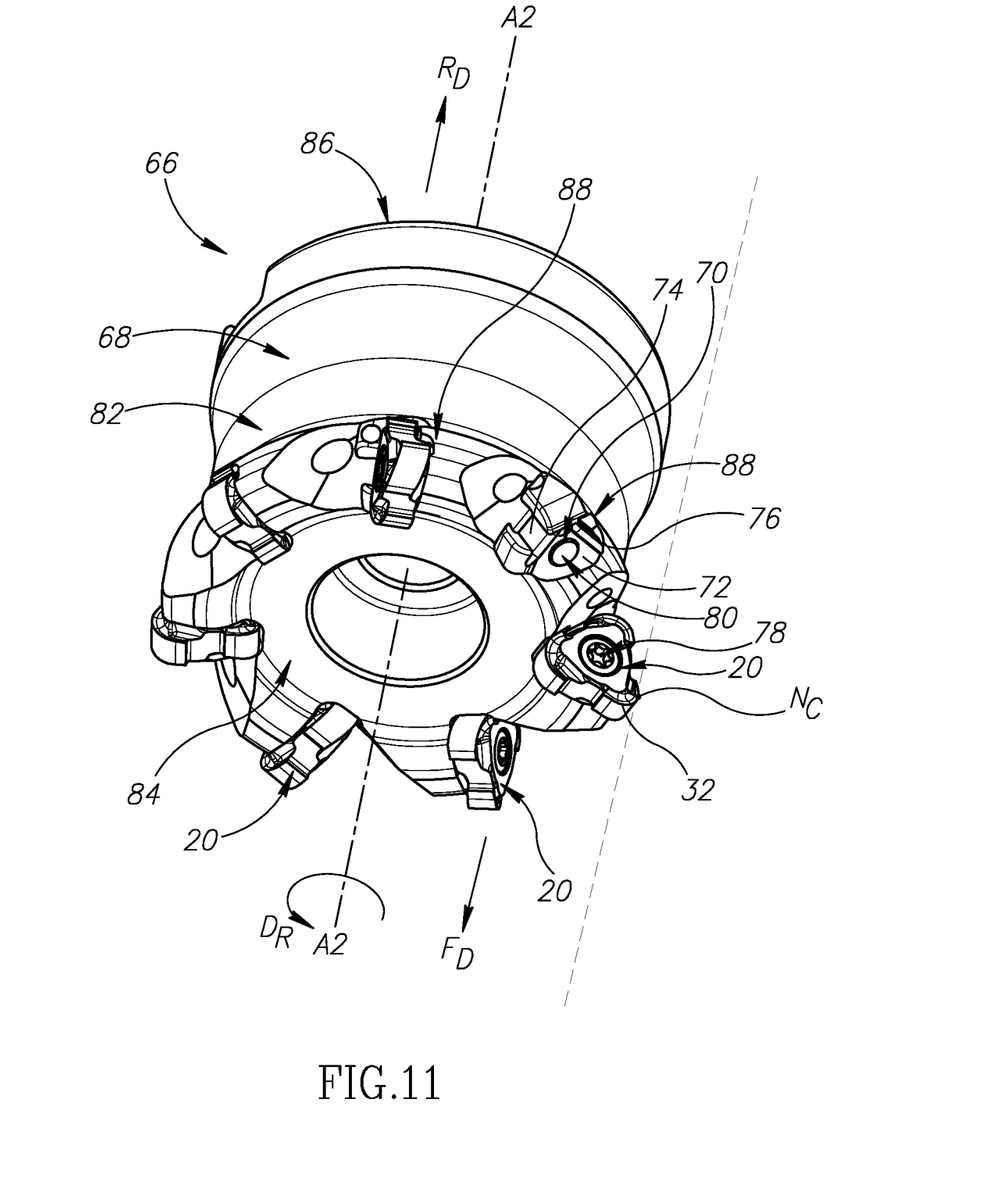
FIG. 11 is a perspective view of a cutting tool in accordance with some embodiments of the present invention, with one of its cutting inserts removed.

As shown in FIG. 11, the cutting tool 66 may be rotatable about a tool axis A2, and the second pocket wall 76 of each insert receiving pocket 70 may be entirely located radially further from the tool axis A2 than the first pocket wall 74.

Also as shown in FIG. 11, the tool axis A2 may define a rotation direction $D_R$, and the base surface 72 of each insert receiving pocket 70 may face the rotation direction $D_R$.

In some embodiments of the present invention, as shown in FIG. 11, the cutting body 68 may be cylindrical shaped having a circumferential wall 82 extending between forward and rear ends 84, 86 facing in opposing forward and rearward directions $F_D$, $R_D$, respectively.

Also as shown in FIG. 11, a plurality of insert receiving pockets 70 may be formed in the circumferential wall 82 adjacent the forward end 84, and the first and second pocket walls 74, 76 of each insert receiving pocket 70 may diverge in the forward direction $F_D$.

It should be appreciated that for embodiments of the present invention in which the second pocket wall 76 is located radially further from the tool axis A2 than the first pocket wall 74 and does not extend outside the first imaginary triangle T1, the cutting tool 66 is provided with good clearance at a relief portion 88 of the circumferential wall 82 located rearward of the operative upper or lower cutting edge 32, 56, as shown in FIGS. 11 and 14, thus making the cutting tool 66 particularly suitable for profiling operations.

In some embodiments of the present invention, as shown in FIG. 11, the operative upper or lower cutting edge 32, 56 of each cutting insert 20 may have a radially outermost cutting point $N_C$ located on its respective upper or lower nose edge portion 52, 64.

Also in some embodiments of the present invention, several sets of cutting inserts 20, having different values of upper and lower nose edge radius $R_U$, $R_L$ between the sets, may be removably secured in a plurality of identical insert receiving pockets 70 by a method of manufacturing in which:

the locating surfaces 34 of each set are unground, the lower and upper abutment surfaces 40, 62 of each set are unground, and the corner surfaces 30 of each set are ground such that the radially outermost cutting points $N_C$ of each set are located the same distance from the tool axis A2.

It should be appreciated that the several sets of cutting inserts 20, having unground locating surfaces 34 and unground lower and upper abutment surfaces 40, 62, may be efficiently manufactured from identical green bodies with minimal grinding.

It should be also appreciated that the several sets of cutting inserts 20 can be efficiently mounted on the same cutting body 68 with minimal set-up times by virtue of the radially outermost cutting points $N_C$ of each set being located the same distance from the tool axis A2.

Although the present invention has been described to a certain degree of particularity, it should be understood that various alterations and modifications could be made without departing from the spirit or scope of the invention as hereinafter claimed.

What is claimed is:

1. An indexable triangular-shaped cutting insert (20) comprising:

opposing upper and lower end surfaces (22, 24) with a peripheral surface (26) extending therebetween and a central axis (A1) extending therethrough, the peripheral surface (26) including three side surfaces (28) circumferentially alternating with three corner surfaces (30), each corner surface (30) intersecting the upper end surface (22) to form an upper cutting edge (32), and each side surface (28) having an inwardly recessed locating surface (34), the lower end surface (24) having a raised lower support surface (36) and three lower abutment recesses (38) circumferentially spaced around the lower support surface (36), each lower abutment recess (38) including a radially outward facing lower abutment surface (40), wherein:

in a first cross-section taken in a median plane (M) perpendicular to the central axis (A1) and intersecting the three locating surfaces (34), the three locating surfaces (34) define a first imaginary triangle (T1) having:

three first sides and three first corners, three first bisector planes ($P_B1$), each first bisector plane ($P_B1$) containing the central axis (A1) and bisecting one of the three first corners, and three vertical locating planes ($P_{VL}$), each vertical locating plane ($P_{VL}$) being perpendicular to the median plane (M) and containing one of the three first sides, in a second cross-section taken in a horizontal lower plane ($P_{HL}$) parallel to the median plane (M) and intersecting the three lower abutment surfaces (40), the three lower abutment surfaces (40) define a second imaginary triangle (T2) having:

three second sides and three second corners, and three second bisector planes ($P_B2$), each second bisector plane (PB2) containing the central axis (A1) and bisecting one of the three second corners, none of the three second bisector planes ($P_B2$) is coplanar with any of the three first bisector planes ($P_B1$), and each vertical locating plane ($P_{VL}$) intersects two of the upper cutting edges (32).

2. The cutting insert (20) according to claim 1, wherein:
each first bisector plane ($P_B1$) intersects one of the locating surfaces (34), and
each second bisector plane ($P_B2$) intersects one of the lower abutment surfaces (40).

3. The cutting insert (20) according to claim 1, wherein the entire peripheral surface (26) extends parallel to the central axis (A1) and intersects both the upper and lower end surfaces (22, 24).

4. The cutting insert (20) according to claim 1, wherein the second imaginary triangle (T2) has three vertical abutment planes ($P_{VA}$), each vertical abutment plane ($P_{VA}$) being perpendicular to the median plane (M), containing one of the three second sides, and intersecting one of the upper cutting edges (32).

5. The cutting insert (20) according to claim 1, wherein the horizontal lower plane ($P_{HL}$) intersects the three locating surfaces (34).

6. The cutting insert (20) according to claim 1, wherein the first and second bisector planes ($P_B1$, $P_B2$) associated with rotationally adjacent corners of the first and second imaginary triangles (T1, T2), respectively, form an acute bisector angle ($\beta1$), and wherein the bisector angle ($\beta1$) has a value less than or equal to 30°.

7. The cutting insert (20) according to claim 1, wherein each lower abutment surface (40) is not intersected by any of the three first bisector planes ($P_B1$).

8. The cutting insert (20) according to claim 1, wherein in an end view of the cutting insert (20), the three second corners are located outside the first imaginary triangle (T1).

9. The cutting insert (20) according to claim 1, wherein:
in an end view of the cutting insert (20), each upper cutting edge (32) includes a curved upper nose edge portion (52) having first and second end points ($N_E1$, $N_E2$), and
each vertical locating plane ($P_{VL}$) intersects two of the upper nose edge portions (52) between their respective first and second end points ($N_E1$, $N_E2$).

10. The cutting insert (20) according to claim 9, wherein in a corner side view of the cutting insert (20), each upper nose edge portion (52) slopes towards the median plane (M) along its whole length.

11. The cutting insert (20) according to claim 1, wherein:
the upper and lower end surfaces (22, 24) are identical,
each corner surface (30) intersects the lower end surface (24) to form a lower cutting edge (56),
the upper end surface (22) has a raised upper support surface (58) and three upper abutment recesses (60) circumferentially spaced around the upper support surface (58), and
each upper abutment recess (60) includes a radially outward facing upper abutment surface (62).

12. The cutting insert (20) according to claim 11, wherein:
the median plane (M) is located midway between the upper and lower end surfaces (22, 24), and
the peripheral surface (26) does not exhibit mirror symmetry about the median plane (M).

13. The cutting insert (20) according to claim 11, wherein:
each upper cutting edge (32) is entirely located closer to the median plane (M) than the upper support surface (58), and
each lower cutting edge (56) is entirely located closer to the median plane (M) than the lower support surface (36).

14. A cutting tool (66), comprising:
a cutting body (68) comprising an insert receiving pocket (70) having a base surface (72) and spaced apart first and second pocket walls (74, 76) transverse to the base surface (72), the first and second pocket walls (74, 76) forming an external pocket angle ($\delta1$) in a front view of the insert receiving pocket (70), and
an indexable triangular-shaped cutting insert (20) removably secured in the insert receiving pocket (70) of the cutting body (68), the cutting insert (20) comprising:
opposing upper and lower end surfaces (22, 24) with a peripheral surface (26) extending therebetween and a central axis (A1) extending therethrough,
the peripheral surface (26) including three side surfaces (28) circumferentially alternating with three corner surfaces (30), each corner surface (30) intersecting the upper end surface (22) to form an upper cutting edge (32), and each side surface (28) having a locating surface (34),
the lower end surface (24) having a raised lower support surface (36) and three lower abutment recesses (38) circumferentially spaced around the lower support surface (36), each lower abutment recess (38) including a radially outward facing lower abutment surface (40), and
in a first cross-section taken in a median plane (M) perpendicular to the central axis (A1) and intersecting the three locating surfaces (34), the three locating surfaces (34) define a first imaginary triangle (T1) having:
three first sides and three first corners,
three first bisector planes ($P_B1$), each first bisector plane ($P_B1$) containing the central axis (A1) and bisecting one of the three first corners, and
three vertical locating planes ($P_{VL}$), each vertical locating plane ($P_{VL}$) being perpendicular to the median plane (M) and containing one of the three first sides,
wherein:
the lower support surface (36) makes contact with the base surface (72);
only one of the three locating surfaces (34) is operative, making contact with the first pocket wall (74), and
only one of the three lower abutment surfaces (40) is operative, making contact with the second pocket wall (76).

15. The cutting tool (66) according to claim 14, wherein:
each locating surface (34) is inwardly recessed in an associated side surface (28), and
each vertical locating plane ($P_{VL}$) intersects two of the upper cutting edges (32).

16. The cutting tool (66) according to claim 14, wherein the pocket angle ($\delta1$) has a value greater than 60° and less than or equal to 90°.

17. The cutting tool (66) according to claim 14, wherein:
each first bisector plane ($P_B1$) intersects one of the upper cutting edges (32) and one of the locating surfaces (34), and
the first bisector plane ($P_B1$) intersecting the operative upper cutting edge (32) also intersects the operative locating surface (34) and the first pocket wall (74).

18. The cutting tool (66) according to claim 14, wherein in a second cross-section taken in a horizontal lower plane ($P_{HL}$) parallel to the median plane (M) and intersecting the three lower abutment surfaces (40), the three lower abutment surfaces (40) define a second imaginary triangle (T2) having:

three second sides and three second corners, and three second bisector planes ($P_B2$), each second bisector plane ($P_B2$) containing the central axis (A1) and bisecting one of the three second corners.

19. The cutting tool (66) according to claim 18, wherein none of the three second bisector planes ($P_B2$) is coplanar with any of the three first bisector planes ($P_B1$).

20. The cutting tool (66) according to claim 14, wherein:
the upper and lower end surfaces (22, 24) are identical,
each corner surface (30) intersects the lower end surface (24) to form a lower cutting edge (56),
the upper end surface (22) has a raised upper support surface (58) and three upper abutment recesses (60) circumferentially spaced around the upper support surface (58), and
each upper abutment recess (60) includes a radially outward facing upper abutment surface (62).

21. The cutting tool (66) according to claim 14, wherein:
the cutting tool (66) is rotatable about a tool axis (A2), and
the second pocket wall (76) is entirely located radially further from the tool axis (A2) than the first pocket wall (74).

22. The cutting tool (66) according to claim 14, wherein:
the cutting body (68) is cylindrical shaped having a circumferential wall (82) extending between forward and rear ends (84, 86) facing in opposing forward and rearward directions ($F_D$, $R_D$), respectively,
a plurality of insert receiving pockets (70) are formed in the circumferential wall (82) adjacent the forward end (84), and
the first and second pocket walls (74, 76) of each insert receiving pocket (70) diverge in the forward direction ($F_D$).

23. The cutting tool (66) according to claim 14, wherein:
the base surface (72) is planar,
a pocket plane ($P_P$) parallel to the base surface (72) intersects the first and second pocket walls (74, 76) to form first and second imaginary straight intersection lines (LI1, LI2), respectively, and
the pocket angle ($\delta1$) is formed between the first and second imaginary intersection lines (LI1, LI2).

* * * * *